(12) United States Patent
Maiorana

(10) Patent No.: US 10,780,813 B2
(45) Date of Patent: Sep. 22, 2020

(54) VEHICLE ASSEMBLY HAVING A SLOPED GATE

(71) Applicant: MAC LTT, INC., Kent, OH (US)

(72) Inventor: James A. Maiorana, Hartville, OH (US)

(73) Assignee: Mac LTT, Inc., Kent, OH (US)

( * ) Notice: Subject to any disclaimer, the term of this patent is extended or adjusted under 35 U.S.C. 154(b) by 0 days.

(21) Appl. No.: 16/505,805

(22) Filed: Jul. 9, 2019

(65) Prior Publication Data

US 2019/0329690 A1 Oct. 31, 2019

Related U.S. Application Data

(63) Continuation of application No. 15/646,672, filed on Jul. 11, 2017, now Pat. No. 10,384,585.

(51) Int. Cl.
| | | |
|---|---|---|
| *B60P 1/26* | (2006.01) | |
| *B60P 3/22* | (2006.01) | |
| *E05B 83/08* | (2014.01) | |
| *E05C 9/06* | (2006.01) | |
| *B60P 3/05* | (2006.01) | |
| *E05B 81/10* | (2014.01) | |
| *B60P 1/04* | (2006.01) | |

(52) U.S. Cl.
CPC ............... *B60P 1/26* (2013.01); *B60P 3/2205* (2013.01); *E05B 83/08* (2013.01); *E05C 9/063* (2013.01); *B60P 1/04* (2013.01); *B60P 3/05* (2013.01); *E05B 81/10* (2013.01)

(58) Field of Classification Search
CPC ................ B60P 1/16; B60P 1/286; B60P 1/28
See application file for complete search history.

(56) References Cited

U.S. PATENT DOCUMENTS

| | | |
|---|---|---|
| 2,239,029 A | 4/1941 | Barrett |
| 6,189,976 B1 | 2/2001 | Lawson |
| 6,386,818 B1 | 5/2002 | Reed |
| 6,952,996 B2 * | 10/2005 | Sisk ....................... B65D 90/10 105/282.2 |
| 7,993,573 B2 * | 8/2011 | Charczuk .................. B60P 1/16 266/232 |
| 8,777,324 B2 | 7/2014 | Wink |
| 9,061,623 B2 | 6/2015 | MacLean et al. |
| 2007/0000545 A1 | 1/2007 | Cannon et al. |
| 2017/0234045 A1 | 8/2017 | Buckner |
| 2017/0253168 A1 * | 9/2017 | Cannon .................. F17C 13/06 |
| 2018/0086245 A1 | 3/2018 | Heck |

* cited by examiner

*Primary Examiner* — Kaitlin S Joerger
(74) *Attorney, Agent, or Firm* — Sand, Sebolt & Wernow Co., LPA

(57) ABSTRACT

The current disclosure relates to a tank trailer for transporting meat packaging by-products. The tank trailer has a cylindrical body having a sloped rear end. An opening is formed in the sloped rear end, and a gate selectively blocks the opening. A locking mechanism is provided to securely lock the gate to the cylindrical body, thereby sealing the cylindrical body. The sloped rear end forms a chute through which meat by-products can be poured. The chute extends for a distance rearwardly of the trailer's rear wheel assembly.

13 Claims, 7 Drawing Sheets

VEHICLE ASSEMBLY HAVING A SLOPED GATE

CROSS REFERENCE TO RELATED APPLICATIONS

This is a Continuation application of U.S. patent application Ser. No. 15/646,672, filed on Jul. 11, 2017; the disclosure of which is incorporated herein by reference.

BACKGROUND

Technical Field

Generally, the current disclosure relates to a vehicle. Specifically, the current disclosure is directed to a tank trailer. More particularly, the current disclosure relates to a tank trailer having a sloped gate at the end of the tank trailer, and the sloped gate provides a chute so that a load exits the tank trailer a distance away from the undercarriage.

Background Information

A tank trailer is primarily built to carry liquid type materials such as oil or liquid alcohol. However, sometimes, tank trailers can also be used to carry by-products from a meat packaging plant to a location where the by-products are further processed. Generally, after transporting the load to the end location, these by-products need to be poured from the tank trailer into a designated receptacle or container in the ground. Liquid loads are usually unloaded from a tank trailer through a plurality of ports and hoses. However, by-products of meat packaging plants tend to include bits of meat and bone. These solid products cannot easily be removed from the tank trailer through a hose or port as the solid components tend to block the hose or the port. Because of this, a special tank trailer has been developed that has a rear tail gate that is opened and allows by-products to be removed through the opening at the back of the trailer. The problem with the presently known tank trailers is that when the by-products are poured from the tank trailer, blood and bits of meat and bone tend to splash up onto the trailer's undercarriage, contaminating the same.

SUMMARY

The current disclosure relates to a tank trailer that addresses some of the problems of previously known tank trailers that are used to transport meat packaging by-products.

The current disclosure relates to a tank trailer for transporting meat packaging by-products. The tank trailer has a cylindrical body having a sloped rear end. An opening is formed in the sloped rear end, and a gate selectively blocks the opening. A locking mechanism is provided to securely lock the gate to the cylindrical body, thereby sealing the cylindrical body. The sloped rear end forms a chute through which meat by-products can be poured. The chute extends for a distance rearwardly of the trailer's rear wheel assembly and tends to prevent the meat by-products from splashing up onto the trailer's undercarriage.

In one aspect, the current disclosure may provide a tank trailer comprising: a cylindrical body including: a top, a bottom, a front, and a rear, wherein a longitudinal axis extends between the front and the rear, and a vertical plane extends between the top and the bottom, and wherein the top, bottom, front, and rears bound and define an interior compartment adapted to carry a load, wherein the rear is oriented at an acute angle relative to the vertical plane, and wherein the rear defines an opening that is in communication with the interior compartment.

In another aspect, the current disclosure may provide a method of dumping a load out of a tank trailer, comprising steps of: providing a tank trailer having a cylindrical body including a top, a bottom, a front and a rear; wherein a longitudinal axis extends between the front and rears, and a vertical plane extends between the top and bottoms, and wherein the top, bottom, front, and rears bound and define a compartment, orienting the rear at an acute angle relative to the vertical plane, defining an opening in the rear that is in communication with the compartment, carrying the load in the compartment, defining a chute in a rear end of the body; where the chute comprises a portion of each of a left side and a right side of the body as well as a portion of the bottom, and removing the load from the compartment through the chute.

In another aspect, the current disclosure may provide a method of fabricating a tank trailer, comprising steps of: providing a cylindrical body having a forward section and a rearward section, providing a gate assembly comprising an annular flange having a front end and a rear end, wherein the rear end is oriented at an acute angle relative to a vertical plane that extends between a left side and a right side of the annular flange; and wherein the rear end and the annular flange define an opening, engaging the annular flange with the rearward section of the cylindrical body, and securing the annular flange to the rearward section of the cylindrical body.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
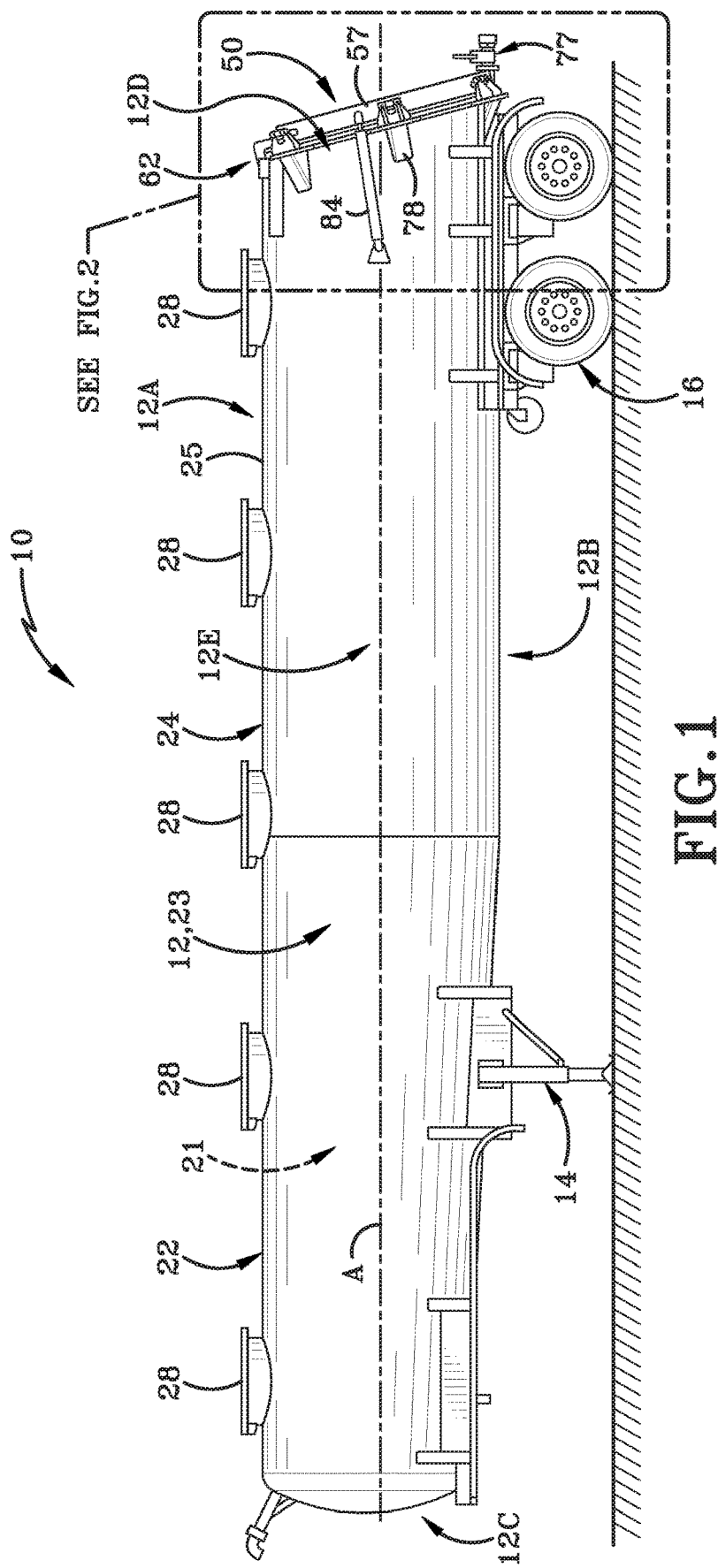
FIG. 1 is a left side elevation view of a tank trailer with a sloped rear end equipped with a gate assembly in accordance with the current disclosure.
Figure 5:
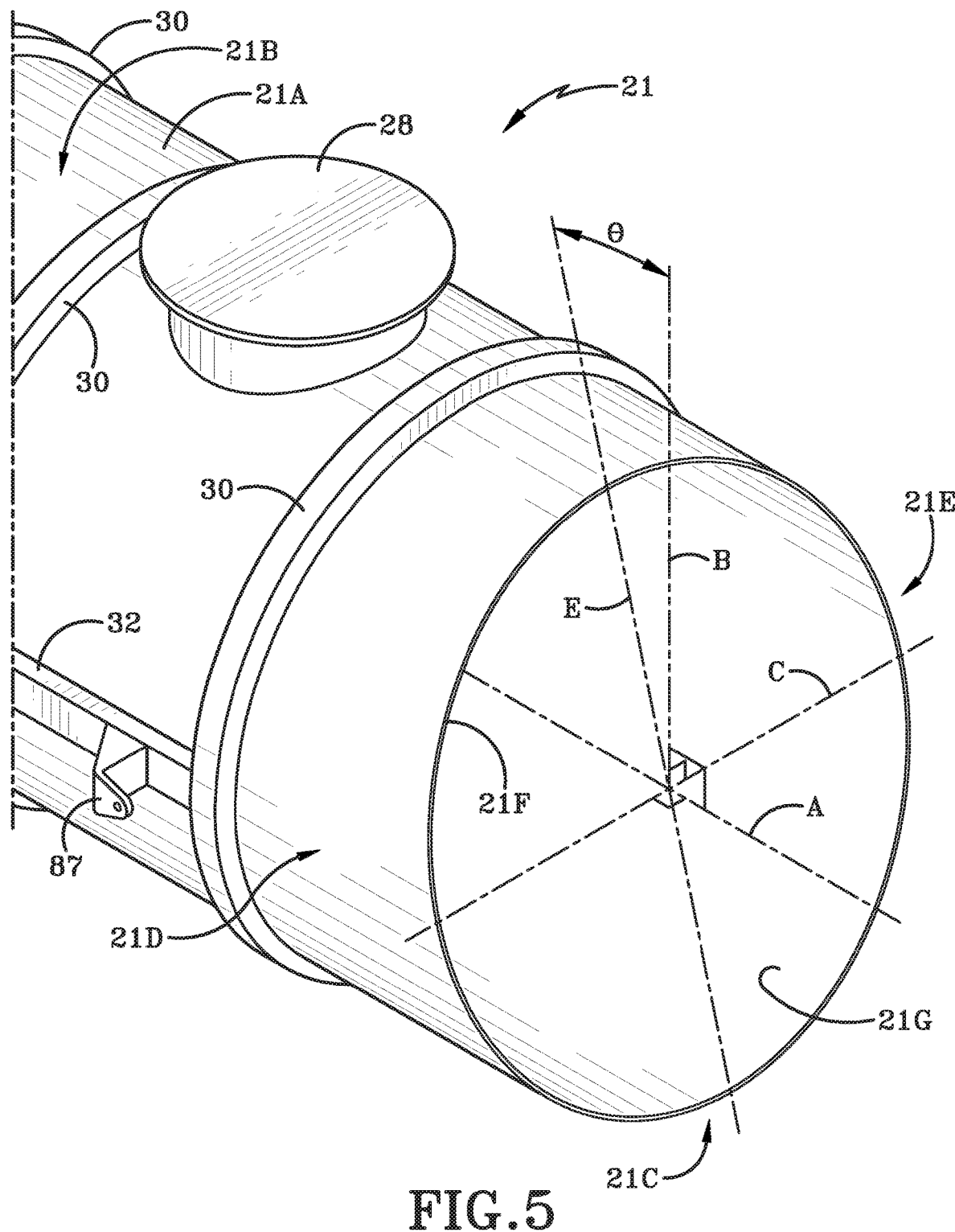
FIG. 5 is a partial isometric perspective view of the cylindrical body.

FIG. 1 illustrates a tank trailer 10 comprising a cylindrical body 12 having a gate assembly 50 engaged therewith, a landing gear 14, and a rearward wheel assembly 16. The body 12 has a top 12A, a bottom 12B, a front 12C, a rear 12D, a left side 12E, and a right side 12F (FIG. 5). Body 12 has a longitudinal axis "A" that extends from front 12C to rear 12D.

Figure 4:
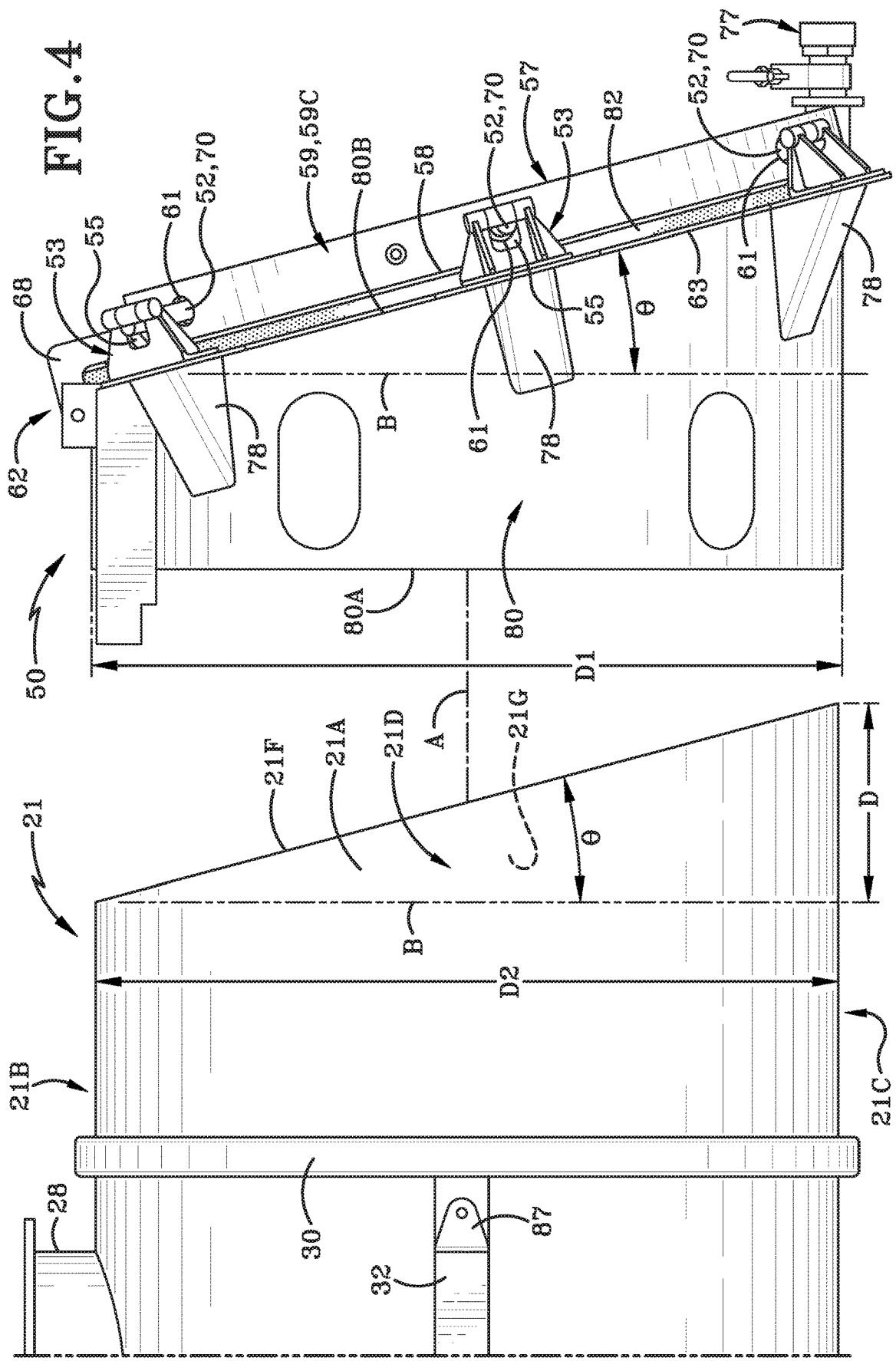
FIG. 4 is a partial exploded left side elevation view of the gate assembly and a cylindrical body of the tank trailer without the outer skin.

As will be discussed later herein, body 12 is comprised of an inner tank 21 and an outer skin 23 that is provided over an exterior of inner tank 21. Inner tank 21 includes a cylindrical wall 21A having a top 21B, a bottom 21C, a left side 21D, a right side 21E and a rear edge 21F. Inner tank bounds and defines a compartment 21G in which a load may be carried. A vertical plane, designated by vertical axis "B" (FIG. 5) extends between the top 21B and the bottom 21C of inner tank 21. A horizontal plane, designated by horizontal axis "C" extends between the left side 21D and the right side 21E of inner tank 21. The rear edge 21F of inner tank 21 slopes longitudinally downwardly and rearwardly from top 21A. Sloped rear edge 21F defines a plane "E" that is oriented at an angle θ relative to the vertical plane "B". As shown in FIG. 4, the location where rear edge 21F intersects bottom 21D is spaced a distance "D" longitudinally and rearwardly from the location where the rear edge 21F intersects the top 21B.

Figure 6:
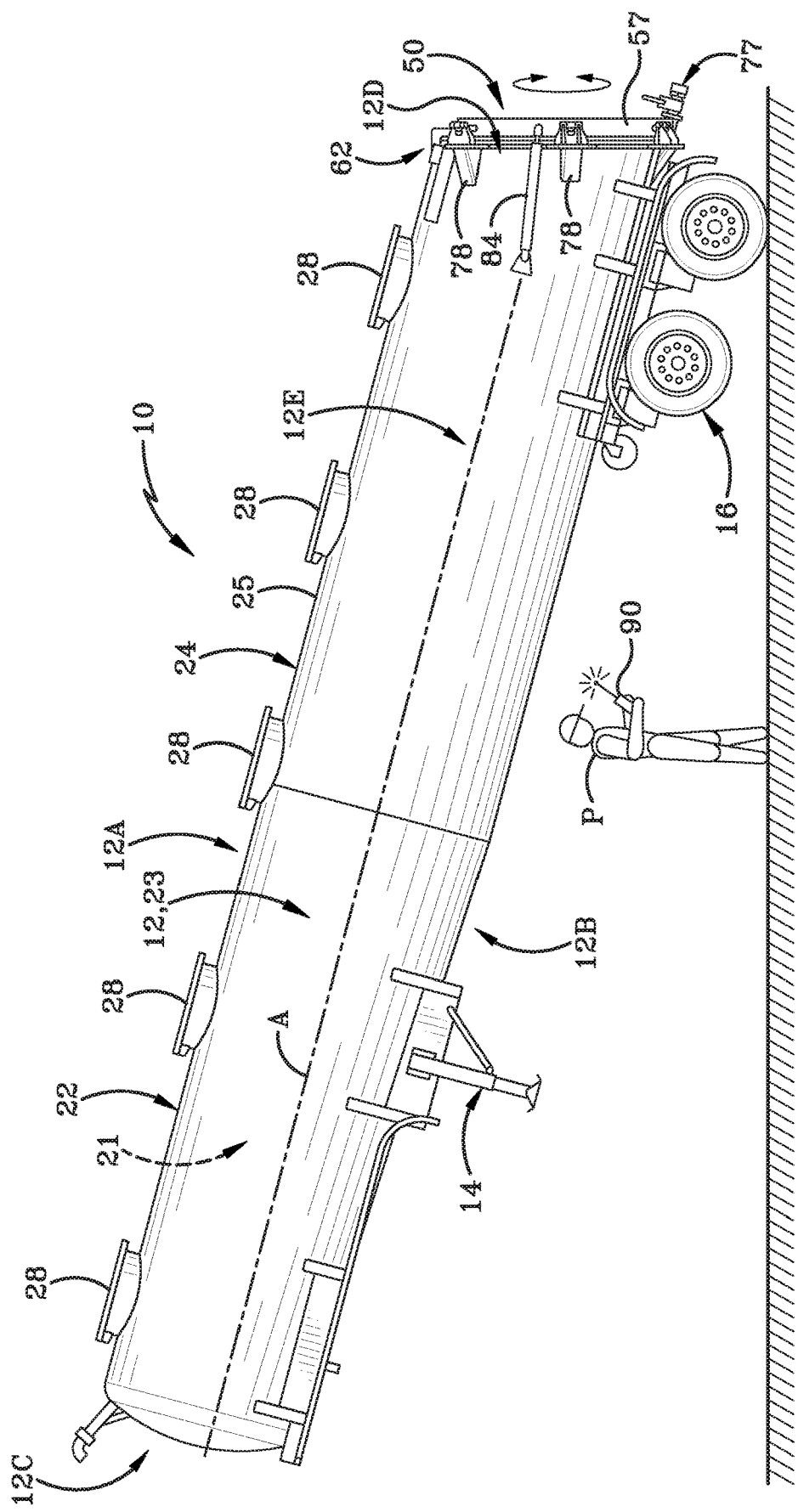
FIG. 6 is a diagrammatic operational view of the tank trailer positioned to dump a load carried therein.

The body 12 comprises a forward section 22 and a rearward section 24. The landing gear 14 is attached to the forward section 22, and the rearward wheel assembly 16 is attached to the rearward section 24. The forward section 22 is adapted to be engaged with a cab or tractor so that the body 12 can be towed thereby. In some instances, a hydraulic lifting assembly may be operatively engaged with the forward section 22. When activated, the lifting assembly may raise the forward section 22 relative to the rearward section 24. FIG. 6 shows the tank trailer 10 in a position where the forward section 22 has been raised (the cab or tractor has been omitted from the drawing).

As depicted in FIGS. 1 and 5, the cylindrical body 12 comprises an inner tank 21 and an outer skin 23. The body 12 further comprises a plurality of entrance ports 28, a plurality of annular ribs 30, and hydraulic mountings 32. The annular ribs 30 circumferentially surround the exterior surface of the inner tank 21. As shown in FIG. 1, the entrance ports 28 are located at an apex 25 of the top 12A of body 12 and the entrance ports 28 are spaced a distance longitudinally apart from each other. One of the mountings 32 is shown in FIG. 5. Another mounting 32 is provided on the right side of the inner tank 21. The inner tank 21 is manufactured out of materials that are of a food grade quality. In other words, materials used to make the inner tank 21 will not contaminate meat by-products carried by the tanker trailer and the by-products will not damage the inner tank 21. One suitable material for the inner tank 21 may be stainless steel.

Figure 2:
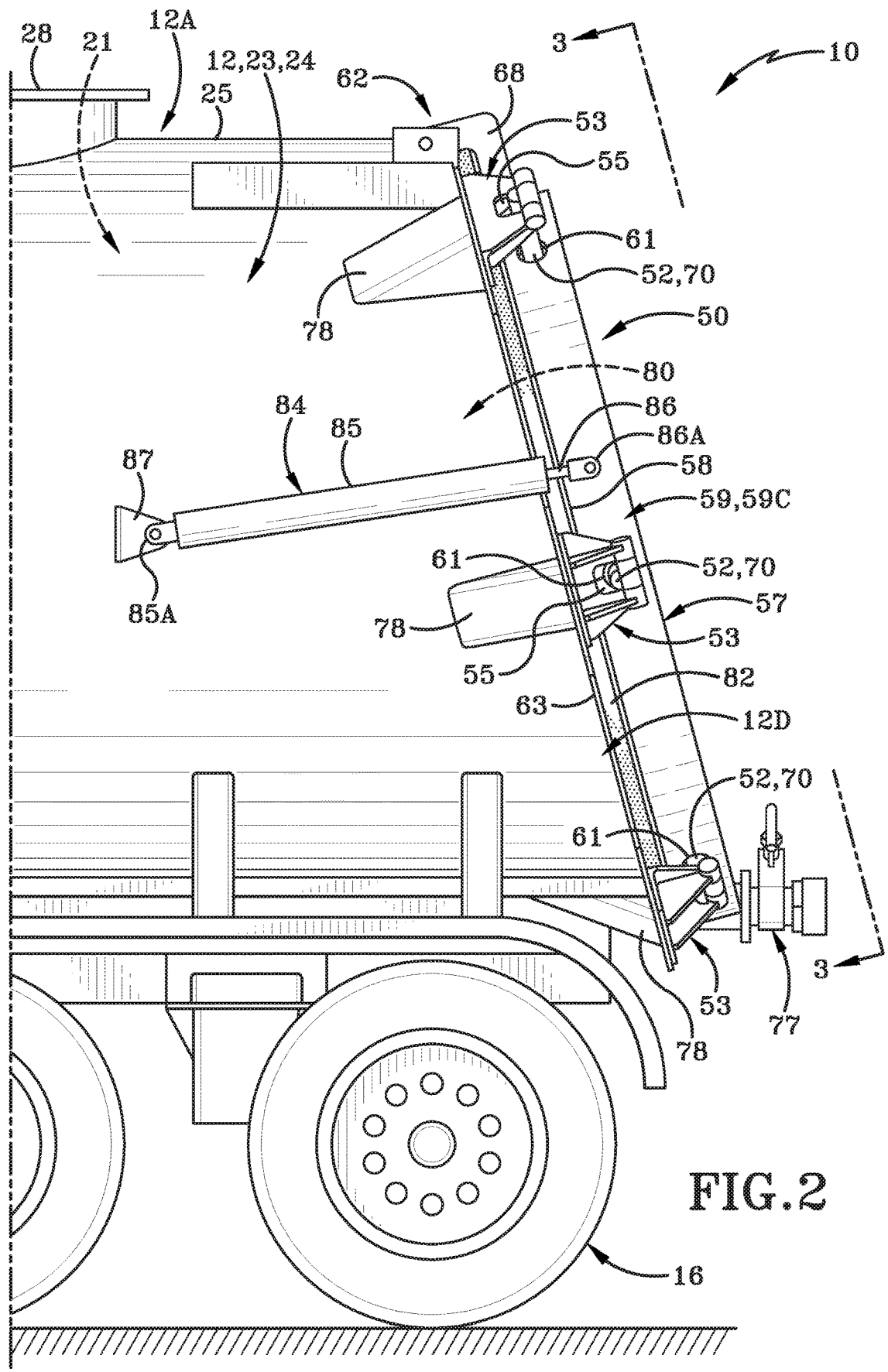
FIG. 2 is an enlarged view of the highlighted region of FIG. 1.
Figure 3:
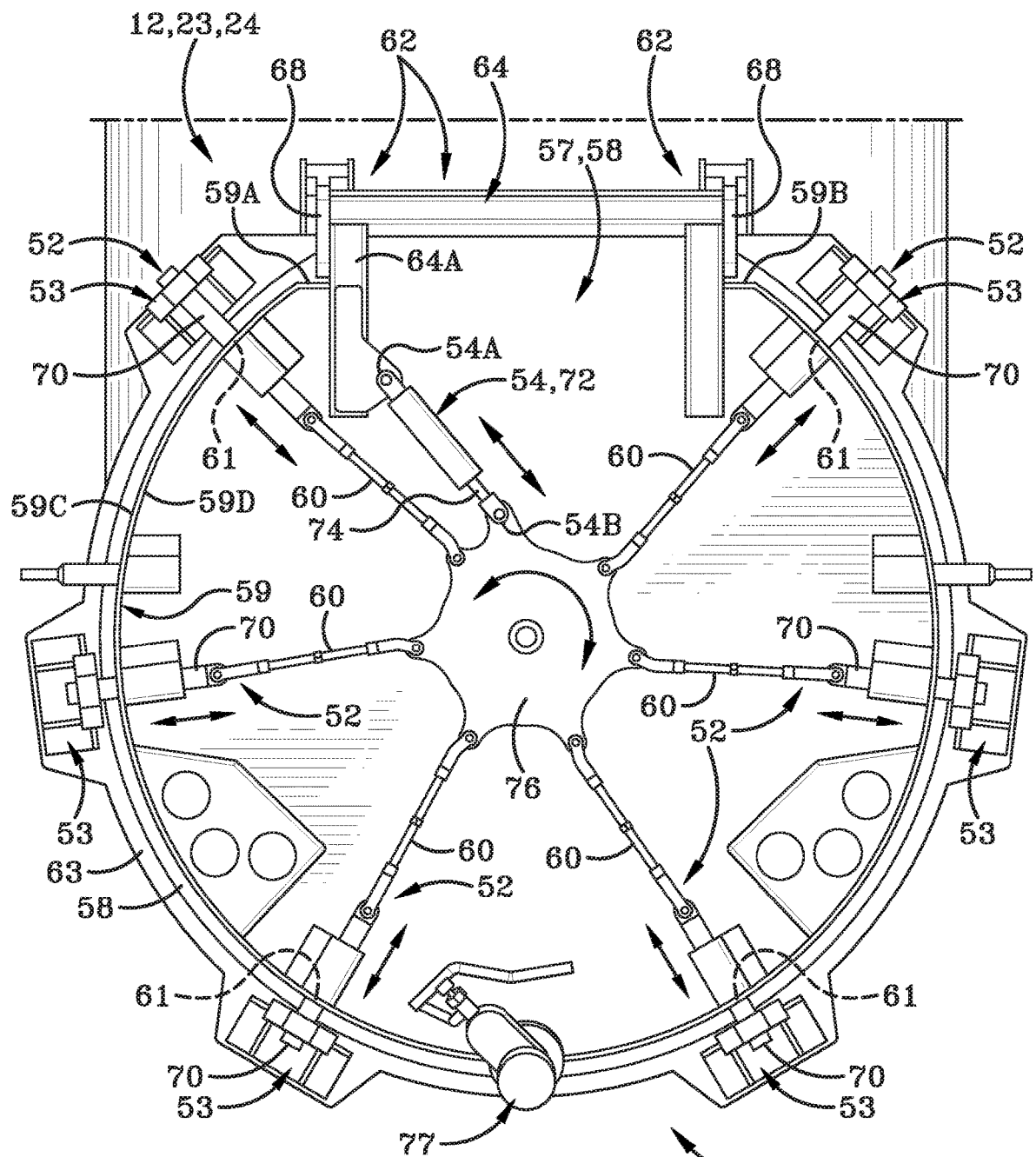
FIG. 3 is a rear evaluation view of the tank trailer taken along 3-3 of FIG. 2 and with the outer skin of the tank trailer removed.

As indicated in FIGS. 1, 2, 3, and 4, a gate assembly 50h is fixedly attached to the rear end of inner tank 21. As shown in FIG. 4, the gate assembly 50 comprises an annular flange 80, an annular rear rim 63, a seal 82, and a gate 57. As shown in FIG. 3, the gate assembly 50 further comprises a plurality of locking assemblies 52, a plurality of locking brackets 53, a first hydraulic actuator assembly 54, an annular plate 58, an annular rim 59, a plurality of articulating arms 60, and a connecting assembly 62. Connecting assembly 62 includes a flange 80, a rib assembly 64 and a hinge bracket 68. The connecting assembly 62 permits the gate 57 to pivot relative to the body 12.

The tank trailer 10 is fabricated by engaging the cylindrical body 12 and the gate assembly 50 together. The annular flange 80 of the gate assembly 50 has a front end 80A and rear end 80B. The rear end 80B slopes downwardly and rearwardly from the top of the flange in a longitudinal direction. Rear end 80B is oriented at an acute angle relative to the vertical plane "B" that extends between a left side and a right side of the annular flange 80. The acute angle is substantially identical to the angle θ of the sloped rear 12D. The rear end 80B of the annular flange 80 defines an opening therein which may be selectively blocked by the gate 57. As shown in FIG. 4, a diameter of the annular flange 80 as indicated by "D1" is greater than a diameter of the inner tank 21 as indicated by "D2" so that the gate assembly 50 may tightly fit onto the inner tank 21. In another embodiment, "D2" may be greater than "D1" so that the gate assembly 50 may be tightly inserted into the inner tank 21.

The front end 80A of the annular flange 80 also defines an opening therein, and this opening is sized and shaped to receive the rearward section 24 of the inner tank 21 therein. When the rearward section 24 is received within a forward opening defined by annular flange 80, the rear edge 21F of inner tank 21 abuts the complementary sloped rear end 80B of the annular flange 80. The rear rim 63 covers the rear edge 21F and defines an opening in the rear end of the trailer 10 and through which a load may exit the tank trailer 10. The annular flange 80 is fixedly secured to the rearward section 24 by any suitable means such as welding.

As shown in FIG. 4, triangular-shaped braces 78 are provided to strengthen the rear rim 63. Locking brackets 53 are provided on the rim 63 adjacent braces 78. The other portion of each brace 78 is fixedly attached to the annular flange 80 of the gate assembly 50. As depicted in FIGS. 2, 3, and 4, the seal 82 is sandwiched between the gate 57 and the annular rear rim 63. When the annular flange 80 is engaged with the inner tank 21, the compartment 21G is placed in communication with the opening defined by the rear rim 63. Gate 57 is in a position to selectively block the opening. As shown in FIG. 3, a drainage port 77 may be provided in gate 50 to allow fluids to flow out of compartment 21G without opening gate 50.

As depicted in FIG. 3, the annular rim 59 circumferentially extends from a first end 59A to a second end 59B along a circumferential edge of the annular plate 58. The annular rim 59 defines a plurality of holes 61 which extend from an outer surface 59C to an inner surface 59D of the rim 59. A first hydraulic actuator assembly 54 comprises a cylinder 72 and a rod 74. A first end 54A of the actuator assembly 54 is connected to an arm 64A of the rib assembly 64, and a second end 54B of the actuator assembly 54 is connected to a central circular plate 76 which is rotatable as indicated by the arrow in FIG. 3. A plurality of locking assembly 52 is provided to selectively and securely connect the gate 57 to the cylindrical body 12. Each locking assembly 52 comprises a tapered end locking rod 70 that is extendable through one of the opening 61 in rim 59. Each locking assembly 52 further comprises an articulating arm 60 which connects the locking rod 70 to the center plate 76. When the rod 74 is extended outwardly from the cylinder 72, then the center plate 76 rotates in a first direction (clockwise). When the rod 74 is withdrawn into the cylinder 72, then the center plate 76 rotates in a second direction (counter-clockwise). When the center plate rotates 76 in the first direction, the locking rod 70 is withdrawn from the locking bracket 53. When the center plate 76 rotates in the second direction, the locking rod 70 extends out of hole 61 in the rim 59 and into the hole 55 of the bracket 53. In other words, when the center plate 76 is rotated in the first direction, the locking mechanism is moved to the opened position. When the center plate 76 is rotated in the second direction, the locking mechanism is moved to the locked position.

Figure 7:
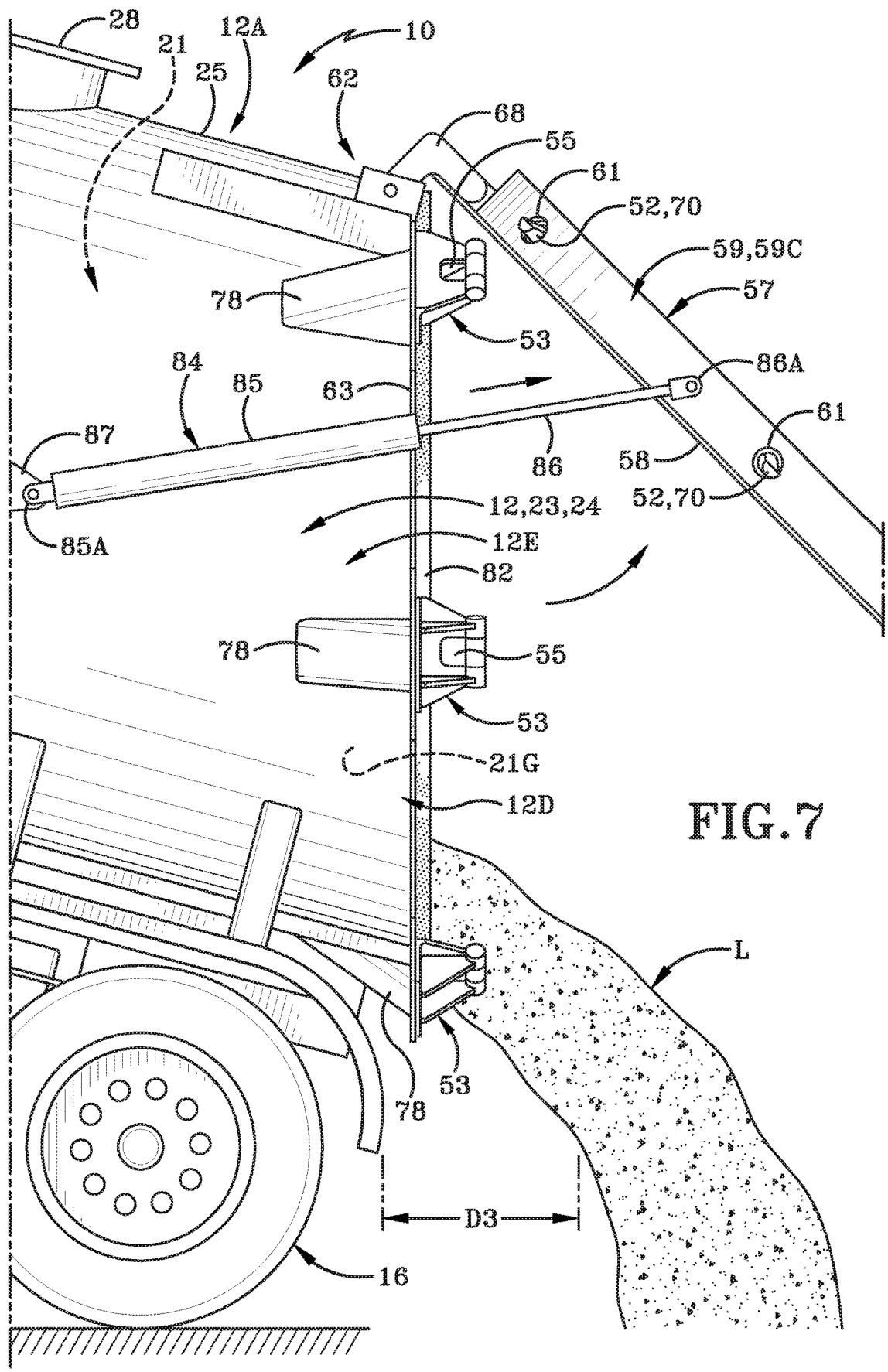
FIG. 7 is a partial left side elevation view showing the tank trailer dumping a load.

As depicted in FIGS. 2, 5, and 7, the gate 57 is connected to the cylindrical body 12 by a second hydraulic actuator 84. The actuator 84 comprises a cylinder 85 and a rod 86. A first end 86A of the rod 86 is operatively engaged with the outer surface 59C of the gate 57. An end of 85A of the cylinder 85 is operatively engaged to an actuator mounting bracket 87 which is fixedly attached to the inner tank 21 as previously described.

In operation, as shown in FIG. 6, the forward section 22 of the tank trailer 10 may be raised by any known method. At this point, the gate 57 is in a closed and locked position. The locking, unlocking, opening or closing of gate assembly 50 may be remotely controllable by an operator "P". For instance, operator "P" may sit inside the cab of the vehicle towing trailer 10 or may stand outside of the tank trailer 10 and use a remote controller 90 to remotely actuate the first hydraulic actuator 54. As previously described, when the actuator 54 is activated, the center plate 76 rotates in the first direction, and the locking mechanism on the gate 57 is moved to the unlocked position. In other words, when activated, the actuator 54 pushes out the rod 74 from the cylinder 72. This rotates the center plate 76 in a clockwise direction. This causes the tapered locking rods 70 to be withdrawn from the locking brackets 53. The gate 57 is then free from its attachment with the body 12 and is free to move.

The operator "P" may then activate the second hydraulic actuators 84 remotely using the controller 90. Each actuator 84 extends the rod 86 from the cylinder 85, and the gate 57 is pivoted to an open position as shown in FIG. 7. Then, the load in the trailer 10 slides down a chute formed by the interior surface of the inner tank 21 and the left and right sides and the bottom adjacent sloped rear end. The load "L" as shown in FIG. 7 drops out of the trailer 10 into a receptacle in the ground. As shown in FIG. 7, the chute formed by rear end of the tank trailer 10 causes the load "L" to be kept a distance "D3" away from the undercarriage of the trailer 10. The distance "D3" correlates the distance that bottom end of the sloped rear edge 21F, 63 is spaced longitudinally away from the top end of the sloped rear edge 21F, 63 (as shown in FIG. 4).

In order to close the locked gate, the steps described above are simply reversed. It will be understood that instead of the first and second actuators being activated in remotely, they may be physically activated by the operator. It will be further understood that the outer plate may be provided on the gate to cover the locking mechanism shown in FIG. 3.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A tank trailer comprising:
    a cylindrical body including:
        a closed top;
        a bottom;
        a front;
        a rear; wherein a longitudinal axis extends between the front and the rear, and a vertical plane extends between the top and the bottom, and wherein the top, bottom, front, and rears bound and define an interior compartment adapted to carry a load;
        a left side and right side extending from the front to the rear with a portion of each of the left side and right side angled downwardly and rearwardly from the top to the bottom; wherein the portions of the left side and the right side and a portion of the bottom define a chute through which the load exits from the interior compartment;
        a gate; wherein the gate is movable between an open position and a closed position, and when in the closed position, the gate blocks the chute;
        an actuator; and
        a locking mechanism; wherein the actuator is operative to cause the locking mechanism to rotate a center plate in one of a clockwise and a counter-clockwise direction, wherein the locking mechanism is movable between a locked position and an unlocked position, and when in the locked position, the locking mechanism locks the gate to the cylindrical body; and wherein the locking mechanism is remotely controllable.

2. The tank trailer of claim 1, wherein the rear is oriented at an acute angle relative to the vertical plane.

3. The tank trailer of claim 2, wherein the rear defines an opening that is in communication with the interior compartment.

4. The tank trailer as defined in claim 1, further comprising a wheel assembly operatively engaged with the bottom, and wherein the bottom extends longitudinally and rearwardly further outwardly from the wheel assembly than does the top.

5. The tank trailer as defined in claim 1, wherein the rear is sloped downwardly and rearwardly from the top.

6. A method of dumping a load out of a tank trailer, comprising steps of:
    providing a tank trailer having a cylindrical body including a closed top, a bottom, a front and a rear; wherein a longitudinal axis extends between the front and rears, and a vertical plane extends between the top and bottoms, and wherein the top, bottom, front, and rears bound and define a compartment;
    orienting the rear at an acute angle relative to the vertical plane;
    defining an opening in the rear that is in communication with the compartment;
    carrying the load in the compartment;
    defining a chute in a rear end of the body; where the chute comprises a portion of each of a left side and a right side of the body as well as a portion of the bottom;
    moving a gate at the rear end of the body from a closed position to an open position
    moving a locking mechanism provided on the gate or on the body from a locked position to an unlocked position, wherein moving comprises:
    actuating a first actuator of the locking mechanism to rotate a center plate in clockwise or counter-clockwise direction;
    moving locking rods of the locking mechanism inwardly towards the center plate;
    actuating a second actuator that is operatively engaged with the body and the gate;
    moving the gate from a closed position to an open position; and
    removing the load from the compartment through the chute.

7. The method of dumping a load in claim 6, further comprising a step of:
    remotely controlling the locking mechanism.

8. The method of dumping a load in claim 6, further comprising a step of:
    raising a front end of the body from a first position to a second position prior to the step of removing the load through the chute.

9. The method of dumping a load in claim 6, wherein the moving locking rods of the locking mechanism further comprises a step of disengaging locking rods from brackets provided on the body.

10. The method of dumping a load in claim 6, wherein steps of actuating one or both first and second actuator is further accomplished by engaging a remote controller.

11. The method of dumping a load in claim 6, further comprising a step of raising a forward section of the tank trailer relative to a rearward section of the tank trailer.

12. A tank trailer comprising:
    a cylindrical body having a circumferential wall, wherein the body includes a front, a rear, a closed top, a bottom, a left side, and a right side, said left and right sides extending from the front to the rear with a portion of each of the left side and right side angled downwardly and rearwardly from the top to the bottom; wherein the wall bounds and define an interior compartment adapted to carry a load, and wherein the portions of the left side and the right side and a portion of the bottom define a chute through which the load exits from the interior compartment;
    a gate movable between an open position and a closed position, and when in the closed position, the gate blocks the opening;
    a locking mechanism operative to move the gate between a locked position and an unlocked position, and when the locking mechanism is in the locked position the gate is unable to move to the open position; wherein the locking mechanism comprises:

a center plate;

a first actuator operative to rotate the center plate in one of a clockwise direction and a counter-clockwise direction;

at least one locking rod operative to selectively move one of inwardly toward the center plate and outwardly toward the rear of the circumferential wall; and a second actuator operatively engaged with the cylindrical body and the gate, wherein the second actuator is actuated to move the gate between the open position and the closed position.

13. The tank trailer as defined in claim 12, further comprising a remote control that is operatively engageable with the locking mechanism, and the remote control is actuated to move the locking mechanism between the locked and unlocked positions.

* * * * *